(12) United States Patent  
Hoffman

(10) Patent No.: US 7,290,883 B2  
(45) Date of Patent: Nov. 6, 2007

(54) SYSTEM AND METHOD FOR PROJECTING VIDEO ONTO A SCREEN

(75) Inventor: Brent William Hoffman, Mooresville, IN (US)

(73) Assignee: TTE Tchnology, Inc., Indianapolis, IN (US)

( * ) Notice: Subject to any disclaimer, the term of this patent is extended or adjusted under 35 U.S.C. 154(b) by 277 days.

(21) Appl. No.: 11/089,107

(22) Filed: Mar. 24, 2005

(65) Prior Publication Data

US 2006/0215121 A1    Sep. 28, 2006

(51) Int. Cl.
- *G03B 21/00* (2006.01)
- *G03B 21/14* (2006.01)
- *G03B 21/26* (2006.01)
- *H04N 5/74* (2006.01)
- *H04N 9/04* (2006.01)

(52) U.S. Cl. .................... 353/31; 353/84; 353/37; 353/20; 353/121; 348/771; 348/270; 348/273; 348/360; 348/743; 348/835

(58) Field of Classification Search .................. 353/31, 353/84, 37, 20, 121; 348/771, 270, 273, 348/360, 743, 835  
See application file for complete search history.

(56) References Cited

U.S. PATENT DOCUMENTS

| | | | |
|---|---|---|---|
| 6,371,617 B1 * | 4/2002 | Nishida et al. ............. 353/122 |
| 6,445,505 B1 * | 9/2002 | Morgan ....................... 359/618 |
| 6,467,910 B1 * | 10/2002 | Sato ............................. 353/84 |
| 6,491,398 B2 * | 12/2002 | Takeuchi et al. .............. 353/31 |
| 6,567,134 B1 | 5/2003 | Morgan |
| 6,771,325 B1 * | 8/2004 | Dewald et al. ............. 348/743 |
| 6,840,631 B2 * | 1/2005 | Sawamura et al. ........... 353/81 |
| 2003/0098835 A1 | 5/2003 | O'Donnell et al. |
| 2004/0001184 A1 | 1/2004 | Gibbons et al. |
| 2005/0001995 A1 * | 1/2005 | Dewald et al. ............... 353/84 |
| 2005/0017938 A1 | 1/2005 | O'Donnell et al. |
| 2005/0046759 A1 | 3/2005 | O'Donnell et al. |
| 2005/0206855 A1 * | 9/2005 | Hori ............................ 353/84 |
| 2006/0050185 A1 * | 3/2006 | Willis ......................... 348/743 |
| 2006/0203134 A1 * | 9/2006 | Willis ......................... 348/771 |

FOREIGN PATENT DOCUMENTS

WO    WO 2005/018237    2/2005

\* cited by examiner

*Primary Examiner*—Diane Lee  
*Assistant Examiner*—Magda Cruz  
(74) *Attorney, Agent, or Firm*—Fletcher Yoder

(57) ABSTRACT

The disclosed embodiments relate to a system and method for projecting video onto a screen. A video unit (10) may comprise a color wheel (14), a light source (12) configured to project light through the color wheel (14) during a spoke time, and a digital micromirror device (18) configured to reflect the projected light (30) onto a screen (26). The method may comprise the acts of shining a generally white light (28) through a region on a color wheel (14) to create a colored light (30), the region comprising two color filters, reflecting the colored light (30) off of a micromirror disposed on a digital micromirror device (18), and projecting the reflected colored light (34) onto a screen (26).

20 Claims, 2 Drawing Sheets

SYSTEM AND METHOD FOR PROJECTING VIDEO ONTO A SCREEN

FIELD OF THE INVENTION

The present invention relates generally to projecting video images onto a screen. More specifically, the present invention relates to a system for reducing dithering noise in a video projection unit, and a method for manufacturing a video unit that exhibits reduced dithering noise when projecting video.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Digital Light Processing ("DLP") is a display technology that employs an optical semiconductor, known as a Digital Micromirror Device ("DMD") to project video onto a screen. DMDs typically contain an array of at least one million or more microscopic mirrors mounted on microscopic hinges. Each of these mirrors is associated with a point on the screen, known as a pixel. By varying the amount of light that is reflected off each of these mirrors, it is possible to project video onto the screen. Specifically, by electrically actuating each of these hinge-mounted microscopic mirrors, it is possible to either illuminate a point on the screen (i.e., "turn on" a particular micromirror) or to leave that particular point dark by reflecting the light somewhere else besides the screen (i.e., "turn off" the micromirror). Further, by varying the amount of time a particular micromirror is turned on, it is possible to create a variety of gray shades. For example, if a micromirror is turned on for longer than it is turned off, the pixel that is associated with that particular micromirror, will have a light gray color; whereas if a particular micromirror is turned off more frequently than it is turned on, that particular pixel will have a darker gray color. In this manner, video can be created by turning each micromirror on or off several thousand times per second. Moreover, by shining colored light at the micromirrors instead of white light, it is possible to generate millions of shades or color instead of shades of gray.

As stated above, the shading of a particular pixel may be partially determined by the length of time that the micromirror corresponding to that pixel is either turned on or turned off. However, as described above, the micromirrors are hinge mounted. As such, there are electrical and mechanical constraints inherent to turning on or turning off a particular micromirror. For example, in current generation DMDs, the minimum amount of time that one of the micromirrors can be turned on is approximately fifteen microseconds. This minimum amount of time is known as the least significant bit ("LSB"). While succeeding generations of DMD technology may reduce this minimum time threshold, it cannot be eliminated, and there are a variety of shades of color that correspond to turning the micromirror on for somewhere between zero seconds and this minimum time threshold (currently fifteen microseconds). These particular shades present special challenges for DLP-based video units.

Dithering is one method to overcome the above described challenges. Dithering involves fooling the eye of the viewer by rapidly turning a micromirror on and then off, such that the mind of viewer blurs the turned on shade and the turned off shade (i.e., black) together to form a shade that corresponds to turning on one of the micromirrors for less than fifteen microseconds. While dithering does increase the number of shades that the DLP system can display, it may cause additional noise, known as either dithering noise or error diffusion noise. This dithering noise reduces the quality of the television picture and in some cases may even be overtly visible to a viewer. Reducing this dithering noise is desirable.

SUMMARY OF THE INVENTION

The disclosed embodiments relate to a system and method for projecting video onto a screen. A video unit (10) may comprise a color wheel (14), a light source (12) configured to project light through the color wheel (14) during a spoke time, and a digital micromirror device (18) configured to reflect the projected light (30) onto a screen (26). The method may comprise the acts of shining a generally white light (28) through a region on a color wheel (14) to create a colored light (30), the region comprising two color filters, reflecting the colored light (30) off of a micromirror disposed on a digital micromirror device (18), and projecting the reflected colored light (34) onto a screen (26).

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
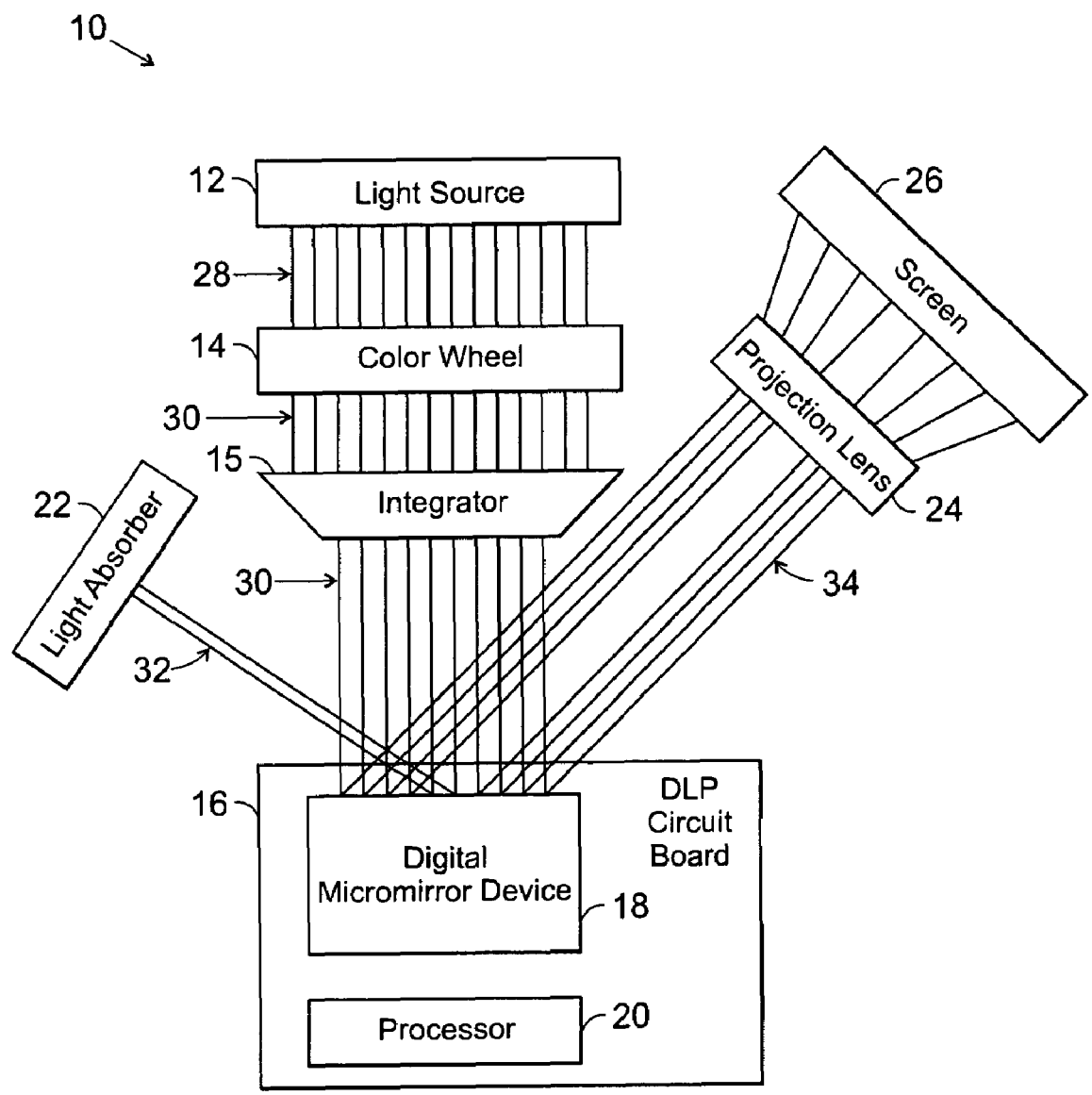
FIG. 1 is a block diagram of a video unit configured to reduce dithering noise in accordance with embodiments of the present invention.

Turning initially to FIG. 1, a block diagram of a video unit configured to reduce dithering noise in accordance with embodiments of the present invention is illustrated and generally designated by a reference numeral 10. In one embodiment, the video unit 10 may comprise a Digital Light Processing ("DLP") projection television. In another embodiment, the video unit 10 may comprise a DLP-based video or movie projector.

The video unit 10 may comprise a light source 12. The light source 12 may comprise any suitable form of lamp or bulb capable of projecting white or generally white light 28.

Lamps or bulbs of this type are well known in the art and need not be described in further detail. In one embodiment, the light source 12 is configured to project, shine, or focus the white light 28 into one static location as described further below.

Figure 2:
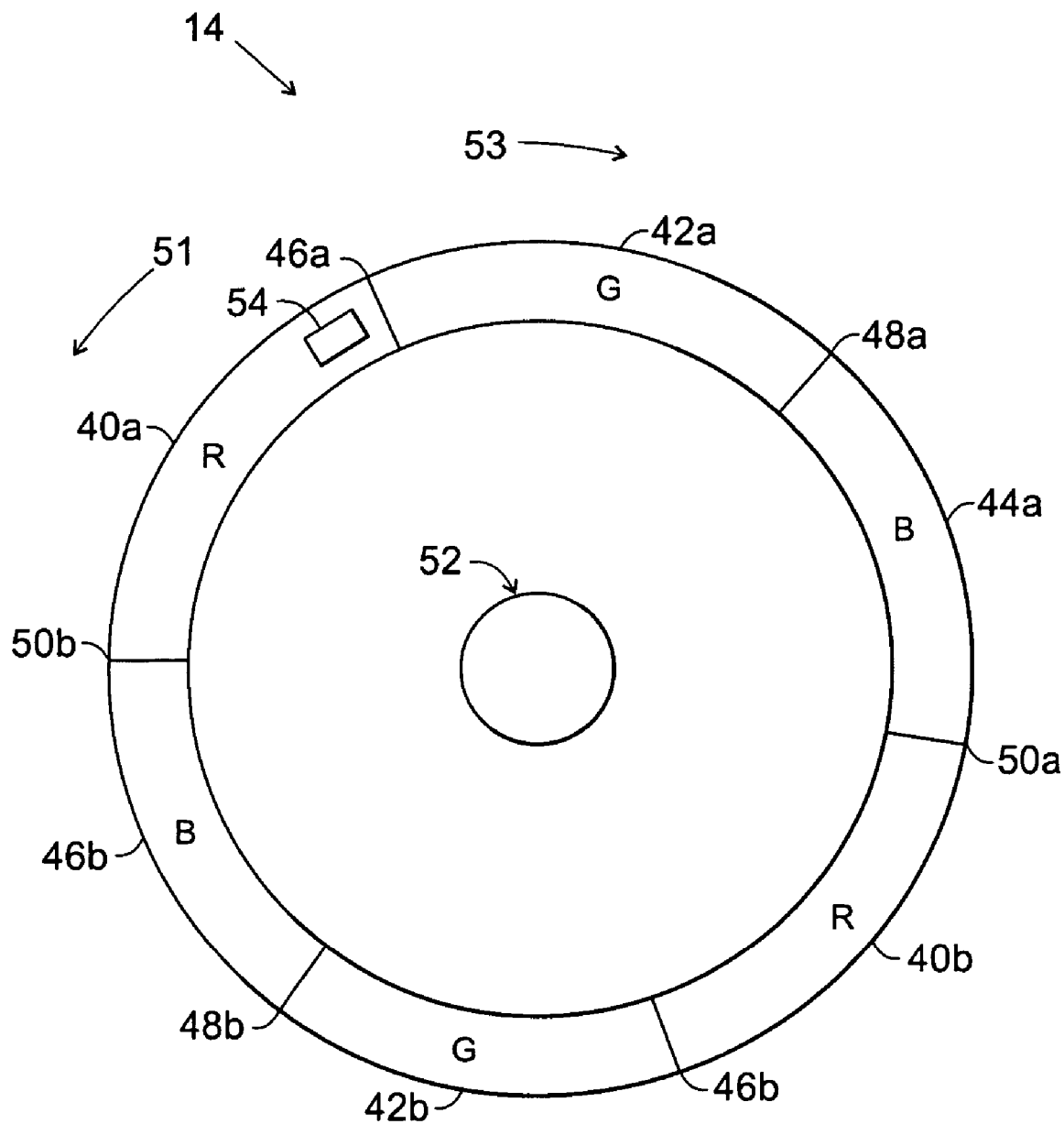
FIG. 2 is a diagram of a color wheel configured to reduce dithering noise in accordance with embodiments of the present invention.

As illustrated in FIG. 1, the exemplary video unit 10 also comprises a color wheel 14 aligned in an optical line of sight with the light source 12. FIG. 2 is a diagram of the color wheel 14 configured to reduce dithering noise in accordance with embodiments of the present invention. The color wheel 14 may comprise a variety of color filters 40a, 40b, 42a, 42b, 44a, and 44b arrayed as arcuate regions on the color wheel 14. Specifically, in the illustrated embodiment, the color wheel 14 comprises color filters 40a, 40b, 42a, 42b, 44a, and 44b configured to convert the white light 28 into one of the three primary colors of light: red, green, or blue. In particular, the illustrated embodiment of the color wheel 14 comprises two red color filters 40a and 40b, two green color filters 42a and 42b, and two blue color filters 44a and 44b. The skilled in the art will appreciate that in alternate embodiments, the specific colors of the filters 40a, 40a, 42a, 42b, 44a, and 44b may be altered or the number of filters may be altered. For example, in one alternate embodiment, the color wheel 14 may comprise only one red color filter 40a, one green color filter 42b, and one blue color filter 44a. In this embodiment, the arcuate regions occupied by the color filters 44a, 44b, and 44c may be approximately twice as long (as measured along the circumference of the color wheel 14) than the color filters 40a, 42b, and 44a depicted in FIG. 2. In still other embodiments, the color filters 40a, 40b, 42a, 42b, 44a, and 44b may occupy either more or less of the surface area of the color wheel depending on the configuration and function of the video unit 10.

In addition, the color wheel 14 may comprise boundaries between each of the filters 40a, 40b, 42a, 42b, 44a, and 44b. These boundaries are known as spokes 46a, 46b, 48a, 48b, 50a, and 50b due to their resemblance to the spokes of wheel. For example, FIG. 2 illustrates three types of spokes: the yellow (i.e., red-green) spokes 46a and 46b, the cyan (i.e., green-blue) spokes 48a and 48b, and the magenta (i.e., blue-red) spokes 50a and 50b.

Turning next to the operation of the color filter 14, each of the filters 40a, 40b, 42a, 42b, 44a, and 44b is designed to convert the white light 28 generated by the light source 12 into colored light 30. In particular, the color wheel 14 may be configured to rapidly spin in a counterclockwise direction 51 around its center point 52. In one embodiment, the color wheel 14 rotates 60 times per second. As described above, the light source 12 may be configured to focus the white light 28 at the color wheel 14. On the opposite side of the color wheel from the light source 12, there may be an integrator 15, which is also referred to as a light tunnel. In one embodiment, the integrator 15 is configured to the evenly spread the colored light 30 across the surface of a Digital Micromirror Device ("DMD") 18. As such, those skilled in the art will appreciate that most, and possibly all, of the light that will be reflected off the DMD 18 to create video will pass through the integrator 15.

Because the integrator 15 is fixed and the color wheel 14 rotates, the light that will enter the integrator 15 can be illustrated as a fixed area 54 that rotates around the color wheel 14 in the opposite direction from the color wheel's direction of rotation. For example, as the color wheel 14 rotates in the counterclockwise direction 51, the fixed area 54 rotates through each the filters 40a, 40b, 42a, 42b, 44a, and 44b in the clockwise direction 53. As such, those skilled in the art will recognize that the colored light 30 entering the integrator 15 will rapidly change from red to green to blue to red to green to blue with each rotation of the color wheel 14 as the fixed area 54 passes through each of the color filters 40a, 40b, 42a, 42b, 44a, and 44b. In other words, because the light source 12 is stationary, the counterclockwise rotation of the color wheel 14 causes the fixed area 54 to rotate in a clockwise direction 53 through the colors of the color wheel. In alternate embodiments, the color wheel 14 itself may rotate in the clockwise direction 53. Those skilled in the area will appreciate that the size and shape of the fixed area 54 is merely illustrative. In alternate embodiments, the size and shape of the fixed area 54 may be different depending on the optical design of the system.

However, as the fixed area 54 passes though each of the spokes 46a, 46b, 48a, 48b, 50a, and 50b, the color of the colored light 30 entering the integrator 15 will not be consistent. In particular, as the fixed area 54 crosses the edge of one particular spoke 46a, 46b, 48a, 48b, 50a, and 50b, the colored light 30 entering the integrator 15 will comprise two different colors of light. These times (when two different colors of light are entering the integrator 15) are referred to as spoke times. In further example, the percentage of red light will decrease and the percentage of green light will increase as the fixed area 54 moves across the spoke 46a into the green filter 42a until the colored light 30 entering the integrator 15 consists entirely of green light (i.e., the fixed area 54 crosses completely out of the red filter 40a wholly into the green filter 42a). The color of the colored light 30 will then remain a consistent green color until the fixed area 54 crosses the spoke 48a.

Because the color of the colored light 30 entering the integrator 15 is not consistent during the spoke times, conventional DLP processors are configured to turn-off all of the micromirrors on the DMD 18 during the spoke times. As will be described further below, embodiments of the present invention comprise turning on one of more of the micromirrors of the DMD 18 during one of the spoke times to reduce dithering noise.

Returning now to FIG. 1, the video unit 10 may also comprise a digital light processing ("DLP") circuit board arrayed within an optical line of sight of the integrator. The DLP circuit board may comprise the DMD 18 and a processor 20. As described above, the DMD 18 may comprise up to one million or more micromirrors mounted on microscopic, electrically-actuated hinges that enable the micromirrors to tilt between a turned on position and turned off position. In the illustrated embodiment, the DMD 18 is also coupled to the processor 20. In one embodiment, the processor 20 may receive a video input and, as described in greater detail below, direct the micromirrors on the DMD 18 to turn on or off, as appropriate to create the video image. In alternate embodiments the processor 20 may be located elsewhere in the video unit 10.

The colored light 30 that reflects off a turned on micromirror (identified by a reference numeral 34) is reflected to a projecting lens 24 and then projected on to a screen 26 for viewing. On the other hand, the colored light that reflects off of a turned off micromirror (identified by a reference numeral 32) is directed somewhere else in the video besides the screen 26, such as a light absorber 22. In this way, the pixel on the screen 26 that corresponds to a turned off micromirror does not receive the projected colored light 30 while the micromirror is turned off.

As described above, the colored light 30 rapidly changes from red to green to blue and then back to red many times per second. When the DMD 18 receives this stream of rapidly changing colored light 30, the micromirrors on the DMD 18 are directed rapidly turn on or off to create the video images. In one embodiment, this direction is provided by the processor 20. This rapid turning on and off of the micromirrors is coordinated to match the sequence of colors in the colored light 30. For example, when the colored light 30 is red, the micromirrors turn on or off as appropriate to generate the shades of red for a particular frame of video. For example, one micromirror may turn on for 25 microseconds to contribute one shade of red to its associated pixel while another one of the micromirrors may turn on for 30 microseconds to contribute another shade of red to a different pixel while still another micromirror may turn off completely for an entire rotation of color wheel 14, if no red light is to projected to a particular one of the pixels during that frame. In a similar fashion, the micromirrors generate shades of green and blue, if needed, for when the colored light 30 is green or blue, respectively.

Because these different colors of light are rapidly changing (e.g. 60 times per second), the viewer sees a cohesive image formed from the three colors of light on the screen 26. For example, to create a particular shade for a particular pixel, the micromirror corresponding to that particular pixel may turn on for 20 microseconds of red light, 22 microseconds of green light, and 17 microseconds of blue light. Alternately, the micromirror may turn on for 20 microseconds of red light and 20 microseconds of blue light, but remain turned off for green light. Those skilled in the art will appreciate that millions of color combinations can be projected by varying the lengths of time that the micromirrors are turned on.

However, as mentioned above, if the particular shade of color corresponds to turning on a micromirror for less than 15 microseconds (i.e., the shade is darker than 15 microseconds worth of light), that particular shade of color cannot be projected in the manner described above. One technique to produce these darker shades, however, is by dithering.

In dithering, the particular micromirror that corresponds to the darker shaded pixel may be turned on for only a portion of the time that the colored light 30 is a particular color. For example, if the video unit 10 wants to project a pixel with a shade that corresponds to 8 microseconds of red light, the micromirror corresponding to that particular pixel may be configured to turn on for 16 microseconds of red light during a video frame and to turn off for the following video frame. As such, the 16 microsecond shade of red and the absence of red (from the turned off period of time) may average out and appear to the viewer as a single shade of red that corresponding to 8 microseconds of red light. While this technique for simulating a particularly shade is effective, turning pixels on and off both temporally and spatially in order to obtain a lower average brightness can generate dither noise. As mentioned above, this dithering noise can degrade the quality of the picture.

One technique to reduce this dithering noise is to use the colored light 30 produced during one of the spoke times to create the dithered color. Those skilled in the art will appreciate that higher luminance light creates more dithering noise than lower luminance light. As such, in one embodiment, the colored light 30 entering the integrator 15 during a particular spoke time is used in place of the colored light 30 projected solely through one of the color filters 40*a*, 40*b*, 42*a*, 42*b*, 44*a*, and 44*b* to dither if the luminance of the color being transitioned to during the spoke time is lower than the luminance of the color being transitioned from. In this way, by mixing a percentage of lower luminance light into the colored light 30 used for dithering, it is possible to reduce the dithering noise because the average luminance of the colored light used for dithering is less than the luminance for color of light being transitioned from. In another embodiment, the colored light 30 generated during a spoke time is only used to dither shades of the green light because green light has a luminance greater than both red light and blue light. In particular, if a shade of green light is desired that corresponds to turning on a micromirror for less than fifteen microseconds, the colored light 30 produced when the fixed area 54 (see FIG. 2) is passing through either the spoke 48*a* or 48*b* is used for dithering. In one embodiment, the colored light 30 used for dithering is cyan light comprising approximately 70% green light and 30% blue light.

Returning again to FIG. 1, the video unit 10 may also comprise a projection lens 24 to project the light reflected from the DMD 18 onto the screen 26. In one embodiment, the projecting lens 24 facilitates the projection of turned-on light 34 by expanding the turned-on light 34 to cover the relatively large area of the screen 26. In an alternate embodiment, the screen 26 may not be a part of the video unit 10. For example, the screen 26 may be mounted on a wall and the video unit 10 may comprise a projector configured to project video across a room to the screen 26.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for projecting an image onto a screen comprising:
   shining a generally white light (28) through a region on a color wheel (14) to create a colored light (30), the region comprising two color filters;
   reflecting the colored light (30) off of a micromirror disposed on a digital micromirror device (18), wherein the reflected colored light comprises portions having higher luminance and portions having lower luminance, thereby reducing dithering noise; and
   projecting the reflected colored light (34) onto a screen (26).

2. The method of claim 1, comprising generating the generally white light (28).

3. The method of claim 1, wherein shining the generally white light (28) comprises shining the generally white light (28) through the region comprising a green filter (42*a* or 42*b*) and a blue filter (44*a* or 44*b*).

4. The method of claim 1, comprising dithering the colored light (30).

5. The method of claim 1, comprising projecting the reflected colored light (34) to a pixel on the screen (26).

6. The method of claim 1, wherein reflecting the colored light (3) off of the micromirror comprises reflecting a cyan colored light off the micromirror.

7. A video unit (10) comprising:
   a color wheel (14);
   a light source (12) configured to project light through the color wheel (14) during a spoke time; and
   a digital micromirror device (18) configured to reflect the projected light (30) onto a screen (26) ), wherein the reflected colored light comprises portions having higher luminance and portions having lower luminance, thereby reducing dithering noise.

8. The video unit (10) of claim 7, comprising a lens (24) to project the reflected light (34) onto the screen (26).

9. The video unit (10) of claim 7, comprising a processor (20) configured to direct a micromirror on the digital micromirror device (18) to reflect the projected light (30) onto the screen (26).

10. The video unit (10) of claim 7, wherein the video unit (10) comprises a digital light processing television.

11. The video unit (10) of claim 7, wherein the video unit (10) comprises a digital light processing projector.

12. The video unit (10) of claim 7, comprising an integrator (15).

13. The video unit (10) of claim 7, wherein the digital micromirror device (18) is configured to reflect substantially green light, wherein the substantially green light is produced by passing the generally white light (28) through a section of the color wheel (14) comprising a green filter (42a or 42b) and a blue filter (44a or 44b).

14. The video unit (10) of claim 7, comprising a light absorber (22) configured to absorb light (32) not projected onto the screen (26).

15. A video unit (10) comprising:
   means for shining a generally white light (28) through an region on a color wheel (14) to create colored light (30), wherein the region comprises two color filters;
   means for reflecting the colored light (30) off of a micromirror disposed on a digital micromirror device (18)), wherein the reflected colored light comprises portions having higher luminance and portions having lower luminance, thereby reducing dithering noise; and
   means for projecting the reflected colored light (34) onto a screen (26).

16. The video unit (10) of claim 15, comprising means for generating the generally white light (28).

17. The video unit (10) of claim 15, wherein the means for shining the generally white light (28) is adapted to shine the generally white light (28) through a green filter (42a or 42b) and a blue filter (44a or 44b).

18. The video unit (10) of claim 15, comprising means for dithering the colored light (30).

19. The video unit (10) of claim 15, comprising means for projecting the reflected colored light (34) to a pixel on the screen (26).

20. The video unit (10) of claim 15, wherein the colored light (30) comprises a cyan light.

* * * * *